US009907232B2

United States Patent
Rosseel et al.

(10) Patent No.: US 9,907,232 B2
(45) Date of Patent: Mar. 6, 2018

(54) AGRICULTURAL BALER AND METHOD FOR PREVENTING AND REMOVING A PLUGGING IN THE FEEDER DUCT OF AN AGRICULTURAL BALER

(71) Applicant: CNH Industrial America LLC, New Holland, PA (US)

(72) Inventors: Bram Rosseel, Snellegem (BE); Jeroen Devroe, Izegem (BE); Dries Liefooghe, Veurne (BE); Dieter Kindt, Vladslo (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/299,057

(22) Filed: Oct. 20, 2016

(65) Prior Publication Data

US 2017/0105354 A1 Apr. 20, 2017

(30) Foreign Application Priority Data

Oct. 20, 2015 (BE) .................................. 2015/5677

(51) Int. Cl.
  *A01F 15/10* (2006.01)
  *A01F 15/04* (2006.01)

(52) U.S. Cl.
  CPC ............ *A01F 15/10* (2013.01); *A01F 15/042* (2013.01); *A01F 2015/102* (2013.01)

(58) Field of Classification Search
  CPC .. A01F 15/101; A01F 15/04; A01F 2015/102; A01F 15/10; A01F 29/10; A01F 15/042; B02C 13/286; B02C 2013/28672

USPC ...................................................... 100/188 R
See application file for complete search history.

(56) References Cited

U.S. PATENT DOCUMENTS

| 4,275,550 | A |   | 6/1981 | Swenson et al. |
|-----------|---|---|--------|----------------|
| 4,569,282 | A |   | 2/1986 | Galant |
| 4,862,684 | A |   | 9/1989 | Naaktgeboren et al. |
| 4,956,967 | A | * | 9/1990 | De Busscher .......... A01F 12/16 100/142 |

(Continued)

FOREIGN PATENT DOCUMENTS

WO    2014129892 A1    8/2014

OTHER PUBLICATIONS

EP16194624, Extended European Search Report, dated Mar. 16, 2017, 12 pages.

*Primary Examiner* — Jimmy T Nguyen
(74) *Attorney, Agent, or Firm* — Peter K. Zacharias; Patrick M. Sheldrake (57) ABSTRACT

A method for preventing or removing a plugging of a feeder duct of a baler. The baler includes a bale chamber including bottom wall in which an inlet opening is formed therein, and a feeder duct including a top wall and a bottom wall extending between a lower end and a upper end of the feeder duct, the top wall providing an upper boundary of the feeder duct and the bottom wall providing a lower boundary of the feeder duct. The method includes steps of increasing a distance between the top wall and the bottom wall of the feeder duct in at least a part of the feeder duct, while leaving an upper boundary provided by the top wall of the feeder duct and a lower boundary provided by the bottom wall of the feeder duct intact, and operating a feeder in the feeder duct.

15 Claims, 8 Drawing Sheets (56) References Cited

U.S. PATENT DOCUMENTS 4,962,632 A 10/1990 Schoonheere et al.
2016/0001294 A1 1/2016 Bergmann et al.

* cited by examiner

AGRICULTURAL BALER AND METHOD FOR PREVENTING AND REMOVING A PLUGGING IN THE FEEDER DUCT OF AN AGRICULTURAL BALER

CROSS REFERENCE TO RELATED APPLICATION

This application claims priority to Belgium Application No. 2015/5677 filed Oct. 20, 2015, the contents of which are incorporated herein by reference.

FIELD OF THE INVENTION

The present invention relates to agricultural balers, and more specifically to rectangular balers, i.e. balers which produce bales of crop material which are rectangular in side view, and to a method relating to the operation of such a baler.

BACKGROUND OF THE INVENTION

In EP0339733 there is disclosed a rectangular baler of basically conventional design in that it comprises a bale chamber in which a bale of crop material is formed, having an inlet opening formed therein communicating with a feeder duct. In the feeder duct feeder means are operable to accumulate a charge of crop material in the feeder duct and then stuff that accumulated charge into the bale chamber for compression by a reciprocally movable plunger operating within the bale chamber.

The bale chamber has a bottom wall in which the inlet opening is formed. The feeder duct has an upper end facing generally upwardly and communicating with the inlet opening in the bale chamber and a lower end facing generally in a forward direction. The upper boundary and the lower boundary of the feeder duct are formed by a top wall and a bottom wall, respectively, extending between the lower end and the upper end of the feeder duct.

In the baler disclosed in EP0339733 the feeder duct is provided with an opening in the bottom wall thereof and with releasable closure means for the opening. The releasable closure means for the opening are in the form of two doors. The doors are hingedly attached to respective opposed edges of the opening in the bottom wall of the feeder duct. A leading or front door, as seen relative to the direction of flow through the feeder duct, is hingedly attached to an edge of a lower end part of the bottom wall. A trailing or rear door is hingedly attached to an edge of an upper end part of the bottom wall. In normal operation of the baler the doors close the opening in the feeder duct. When a plugging of the feeder duct occurs, the feeder means are stopped and the doors are opened, allowing a plug of crop material to discharge onto the ground. Once the plug of crop material has been discharged to the ground, the doors are closed to resume normal operation.

SUMMARY OF THE INVENTION

Although the method for removing a plugging of the feeder duct as described in EP0339733 by opening the lower boundary of the feeder duct provided by the bottom wall thereof so as to discharge a plug of crop material from the feeder duct through said opening onto the ground has been found satisfactory, it is an object of the present invention to provide an improved method for removing a plugging of the feeder duct.

Thereto the method according to the present invention comprises increasing the distance between the top wall and the bottom wall of the feeder duct in at least a part of the feeder duct, in particular in at least the part of the feeder duct where the plugging has occurred, while leaving the upper boundary provided by the top wall of the feeder duct and the lower boundary provided by the bottom wall of the feeder duct intact, and causing the feeder means to operate in the feeder duct with the increased distance between the top wall and the bottom wall.

This method according to the invention allows for dislodging a plug of crop material stuck in the part of the feeder duct wherein the distance between the top wall and the bottom wall of the feeder duct is increased by means of the feeder means that are operable in the feeder duct and subsequently remove the dislodged plug of crop material from the feeder duct by means of the feeder means by transferring the dislodged plug of crop material into the bale chamber. Dislodging the plug of crop material by means of the feeder means that are operable in the feeder duct is made possible by increasing the distance between the top wall and the bottom wall of the feeder duct in at least a part of the feeder duct, thereby releasing the pressure from a plug of crop material stuck in said part of the feeder duct and thereby proving space for a stuck plug of crop material to move. Subsequent removal of the dislodged plug of crop material from the feeder duct by means of the feeder means by transferring the dislodged plug of crop material into the bale chamber is made possible by the upper boundary and lower boundary of the feeder duct provided by the top wall and bottom wall, respectively, being left intact. The method according to the invention thus provides an alternative for discharging the plug of crop material onto the ground. This has as an advantage over prior art methods, as for instance described in EP0339733, that after removing the plug of crop material, there is no plug of crop material laying on the ground underneath the feeder duct, that, as described in EP0339733, hinders the doors of the feeder duct to be closed and the baler from being moved. There is no need for the plug of crop material laying on the ground to be removed from underneath the feeder duct for normal operation of the baler to resume.

In order to allow a plug of crop material plugging a part of the feeder duct to be dislodged and moved by means of the feeder means, the distance between the top wall and the bottom wall of the feeder duct is preferably at least increased in the part of the feeder duct where a plugging has occurred. In an advantageous embodiment of the method according the distance between the top wall and the bottom wall of the feeder duct is additionally increased in the part of the feeder duct down stream, as seen in the direction of conveying, of the part of the feeder duct where the plugging has occurred. This prevents the dislodged plug of crop material to get stuck again while being conveyed by means of the feeder means from the part of the feeder duct where it was dislodged towards the upper end of the feeder duct. Preferably the distance between the top wall and the bottom wall of the feeder duct is increased over substantially the whole length of said down stream part.

In a preferred embodiment of the method according to the invention, the distance between the top wall and the bottom wall of the feeder duct in at least part of the feeder duct is increased by moving the bottom wall away from the top wall in said at least part of the feeder duct. This is advantageous in that in rectangular balers of conventional design, there is more room available for moving the bottom wall away from the top wall than for moving the top wall away from the bottom wall.

The method according to the invention is advantageously applied to a baler comprising a conveying channel communicating with the lower end of the feeder duct for crop material to be conveyed to the feeder duct, and conveying means operable in the conveying channel to convey the crop material along a bottom wall of the conveying channel to the feeder duct, wherein an edge of the bottom wall of the conveying channel is adjacent an edge of the lower end part of the bottom wall of the feeder duct. In case a plugging occurs in the lower end part of the feeder duct of such an application, the distance between the top wall and the bottom wall of the feeder duct is preferably increased in at least said lower end of the feeder duct by moving the lower end part of the feeder duct away from the top wall of the feeder duct, and in addition the bottom wall of the conveying duct is moved such that the adjacent edges of the bottom wall of the conveying duct and of the lower end part of the bottom wall of the feeder duct remain mutually adjacent. This advantageously increases the space available in the end part of the feeder duct.

In an advantageous embodiment of the method according to the invention, the method comprises detecting the occurrence of a plugging of the feeder duct and after detecting the occurrence of a plugging of the feeder duct, increasing the distance between the top wall and the bottom wall of the feeder duct along substantially the whole length of the feeder duct. Increasing the distance between the top wall and the bottom wall of the feeder duct along substantially the whole length of the feeder duct after detecting the occurrence of a plugging of the feeder duct, is suitable for dislodging and removing a plug of crop material irrespective of the location along the length of the feeder duct where the plugging has occurred. For this embodiment to be effective mere detection of the occurrence of a plugging is sufficient. As an advantageous alternative, the method comprises detecting the occurrence of a plugging of the feeder duct, detecting the part of the feeder duct where the plugging has occurred, and increasing the distance between the top wall and the bottom wall of the feeder duct in at least the part of the feeder duct wherein the plugging is detected. This embodiment allows for not increasing the distance between the top wall and the bottom wall of the feeder duct in parts of the feeder duct where it is not necessary to increase the distance. In a preferred embodiment thereof the distance between the top wall and the bottom wall of the feeder duct is additionally increased in the part of the feeder duct downstream of the part wherein the plugging is detected, preferably along substantially the whole length of the remaining downstream part of the feeder duct. Again as discussed herein above this helps to prevent the dislodged plug of crop material to get stuck again while being conveyed by means of the feeder means from the part of the feeder duct where it was dislodged towards the upper end of the feeder duct.

In an alternative embodiment, the method comprises monitoring the crop pressure in the feeder duct, and increasing the distance between the top wall and the bottom wall of the feeder duct along substantially the whole length of the feeder duct in case the crop pressure exceeds a predetermined pressure. This allows for preventing plugging to occur, by increasing the distance between the top wall and the bottom wall of the feeder duct and thereby decreasing the crop pressure in the feeder duct, in case the crop pressure increases as an indication of a plugging about to occur. In an alternative embodiment, the method comprises monitoring the crop pressure in the feeder duct as a function of the location along the length of the feeder duct, and increasing the distance between the top wall and the bottom wall of the feeder duct in at least the part of the feeder duct where crop pressure exceeds a predetermined pressure. This allows for preventing a plugging to occur in a part of the feeder duct while not influencing the crop pressure build up in other parts of the feeder duct where no plugging is about to occur. In a preferred embodiment thereof the distance between the top wall and the bottom wall of the feeder duct is additionally increased in the part of the feeder duct downstream of the part where the crop pressure exceeds a predetermined pressure. This allows for preventing the exceeding crop pressure in a part of the feeder duct to occur again in the part of the crop material in which the exceeding crop pressure was detected while said part of the crop material is conveyed downstream towards the upper end of the feeder duct.

In a preferred embodiment, the crop pressure is monitored by measuring the load on the feeder means during operation thereof in the feeder duct. The load on the feeder duct during operation thereof in the feeder duct is an effective indicator of crop pressure in the feeder duct.

The present invention also relates to a baler, in particular a rectangular baler, said baler comprising means for moving at least one of the top wall and the bottom wall of the feeder duct relative to the other one of the top wall and the bottom wall of the feeder duct in at least part of the feeder duct. The baler according to the invention allows, in accordance with the method according to the invention, to increase the distance between the top wall and the bottom wall of the feeder duct in at least a part of the feeder duct, while leaving the upper boundary provided by the top wall of the feeder duct and the lower boundary provided by the bottom wall of the feeder duct intact, such that the feeder means can be caused to operate in the feeder duct with the increased distance between the top wall and the bottom wall in order to prevent or remove a plugging of the feeder duct.

In a preferred embodiment of the baler according to the invention, at least one of the top wall and the bottom wall of the feeder duct is divided in sections along the length of the feeder duct, said means for moving at least one of the top wall and the bottom wall of the feeder duct are adapted for selectively moving said sections relative to the other one of the top wall and the bottom wall of the feeder duct, wherein for each pair of adjacent sections, adjacent edges of the sections are mutually attached such that when moving the sections adjacent edges of the sections remain adjacent to one another, or said means for moving are adapted to move the sections such that adjacent edges of the sections remain adjacent to one another. This arrangement provides that when moving the sections in order to increase the distance between the top wall and the bottom wall of the feeder duct, the upper or lower boundary of the feeder duct provided by said sections remains intact.

In a preferred embodiment at least one of the sections is in the form of a door, said door section having at least one edge that is selectively movable away from an adjacent edge of an adjacent section in order to provide an opening between said adjacent edges. In case a stuck plug of crop material cannot be removed by increasing the distance between the top wall and the lower wall while leaving the upper and lower boundary in tact, this advantageous feature allows for opening the upper boundary defined by the top wall or lower boundary defined by the bottom wall of the feeder duct in order to remove the stuck plug of crop material via said opening. By opening the lower boundary defined by the bottom wall of the feeder duct it is for instance possible to discharge the stuck plug of crop material onto the ground.

In a preferred embodiment of the baler according to the invention the means for moving at least one of the top wall and the bottom wall of the feeder duct, comprise at least one actuator acting on at least a part of at least one of the top wall and the bottom wall of the feeder duct, a controller connected to the actuator, and optionally sensor means adapted for detecting a plugging of the feeder duct or for sensing crop pressure in the feeder duct, wherein said controller is configured to control said actuator in accordance with an embodiment of the method according to the invention as described herein above.

Alternatively or additionally the means for moving at least one of the top wall and the bottom wall of the feeder duct comprise at least one manually operated member acting on at least a part of at least one of the top wall and the bottom wall of the feeder duct, said manually operated member preferably defining predefined positions of the part on which it acts.

BRIEF DESCRIPTION OF THE FIGURES

The accompanying drawings are used to illustrate present non-limitative preferred exemplary embodiments of the present invention. The above stated and other advantages, features and objectives of the invention will become more apparent, and the invention better understood, from the following detailed description when read in combination with the accompanying drawings, in which.

DETAILED DESCRIPTION OF THE INVENTION

Figure 1:
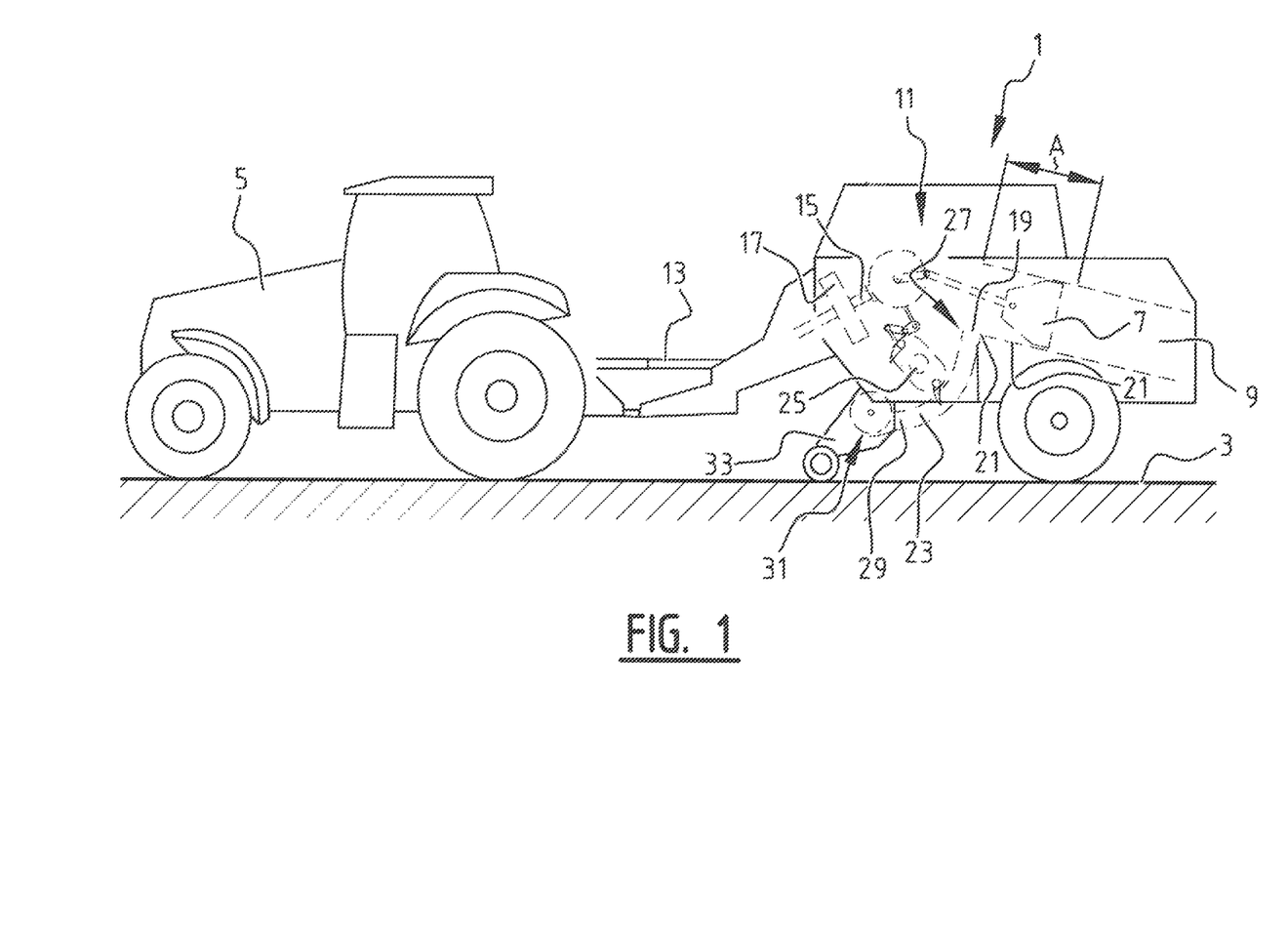
FIG. 1 shows a schematic side view of an embodiment of a baler according to the invention adapted to execute the method according to the invention, drawn and driven by a tractor.

FIG. 1 shows a rectangular agricultural baler 1. Baler 1 can be moved forward over ground surface 3 by means of a tractor 5. In baler 1 is provided with a plunger 7 that during operation is moved reciprocally along a linear path A in bale chamber 9 by means of a crank mechanism 11 connected to plunger 7. Crank mechanism 11 is connected for driving via a drive shaft 13 to the motor of tractor 5. Tractor 5 is provided for this purpose with a power take-off device, also referred to as PTO. Drive shaft 13 connects an output shaft of the PTO of tractor 5 to an input shaft 15 of crank mechanism 11. A flywheel 17 is arranged on the input shaft of the crank mechanism.

The bale chamber 9 has an inlet opening 19 formed in the bottom wall 21 thereof. A feeder duct 23 communicates with the bale chamber 9 through the inlet opening 19 for charges of crop material to be transferred from the feeder duct 23 into the bale chamber 9. Feeder means 25 are operable within the feeder duct 23 to accumulate a charge of crop material therein and then stuff that accumulated charge into the bale chamber 9. The feeder duct 23 has an upper end 27 facing generally upwardly and communicating with the inlet opening 19 in the bale chamber 9 and a lower end 29 facing generally in a forward direction and communicating with a cutting unit 31. The cutting unit 31 is arranged for cutting crop material supplied by a pick-up device 33 and to convey the cut crop material into the feeder duct 23.

Figure 2:
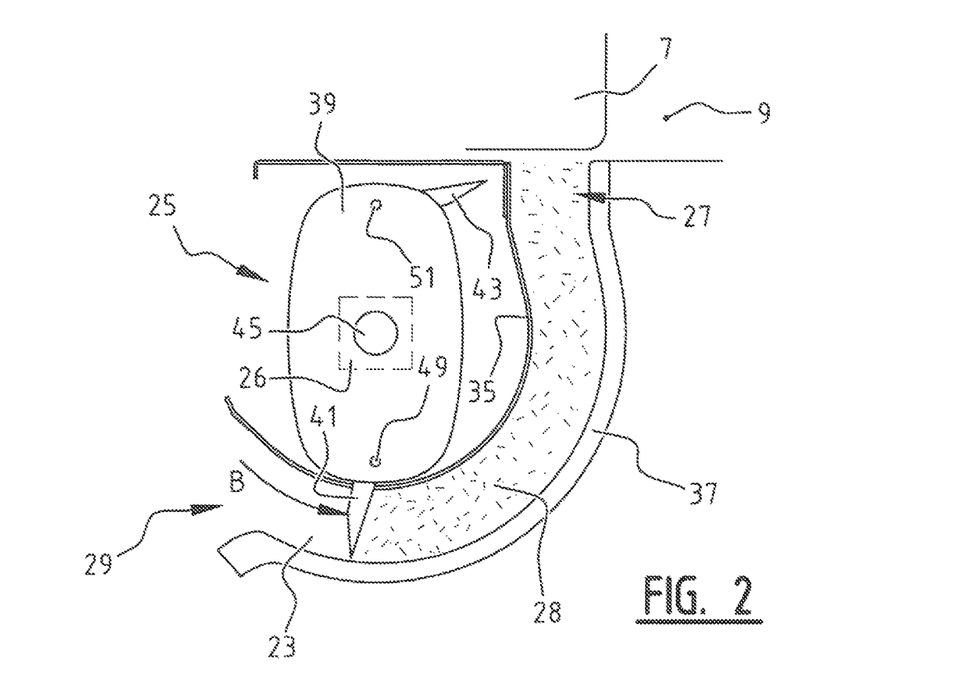
FIGS. 2 and 3 show in schematic side view the feeding duct of the baler of FIG. 1 during normal operation.
Figure 3:
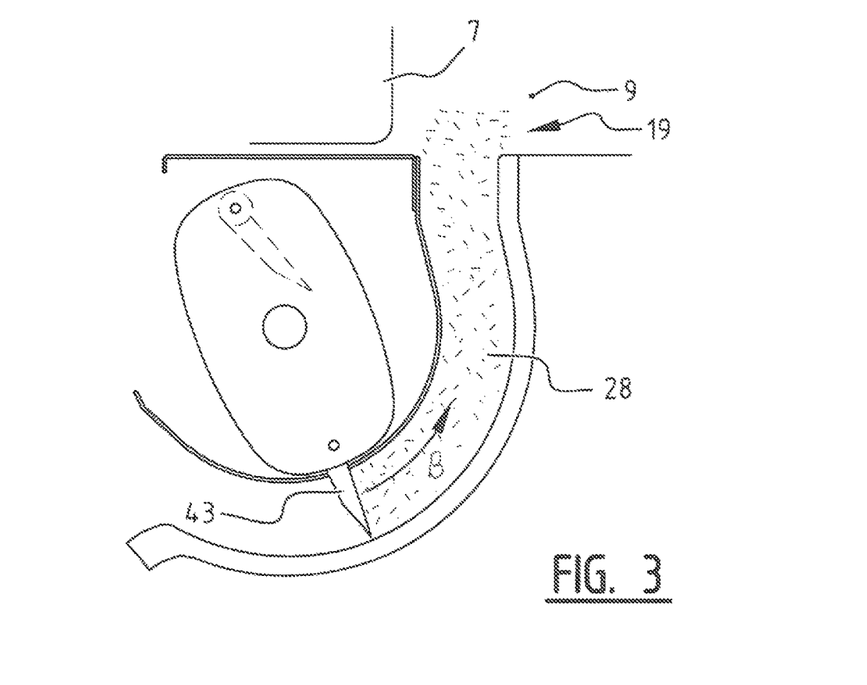

In FIGS. 2 and 3 the feeder duct 23 is shown in more detail during normal operation. The feeder duct 23 is defined between a feeder duct top wall 35 and feeder duct bottom wall 37. The feeder duct top wall 35 provides an upper boundary for the feeder duct 23. The feeder duct bottom wall 37 provides a lower boundary for the feeder duct 23. In the feeder duct 23 feeder means 25 are operable. The feeder means 25 include a rotatable drum 39 having sets of tines 41, 43 arranged thereon. In operation the drum 39 is rotated in the direction of arrow B about axis of rotation 45.

The feeder means 25 further include a schematically shown drive 26. The drive 26 is arranged for rotating the drum 39 in the direction of arrow B about axis of rotation 45. The drive 26 further includes a mechanism for rotating the respective sets of tines 41, 43 relative to the drum 39 about a respective axis of rotation 49, 51, while the drum 39 is rotated in the direction of arrow B about axis of rotation 45. This causes the outer ends of the tines 41, 43 to be moved along a path of movement. This path of movement may be a fixed path of movement or an adjustable path of movement, wherein the drive 26 comprises a mechanism for adjusting the path of movement of the sets of tines 41, 43, while the drum 39 is rotated in the direction of arrow B about axis of rotation 45.

During normal operation, the outer ends of the tines 41, 43 are caused to be moved along a path of movement through the feeder duct 23 in the direction indicated by arrow B, thereby conveying cut crop material that has been conveyed by the cutting unit 31 (shown in FIG. 1) into the lower end 29 of the feeder duct 23, from the lower end 29 of the feeder duct 23 toward the upper end 27 thereof.

As illustrated by means of FIG. 2, the feeder means 25 first accumulate a charge of crop material 28 in the feeder duct 23.

As illustrated by means of FIG. 3, once the charge of crop material 28 has been accumulated, and the plunger 7 has cleared the inlet opening 19 of the bale chamber 9, the outer ends of the tines 43 are caused to be moved along a path of movement through the feeder duct 23 in the direction indicated by arrow B, thereby stuffing, i.e. conveying, the accumulated charge of crop material 28 through the opening 19 into the bale chamber 9.

Figure 4:
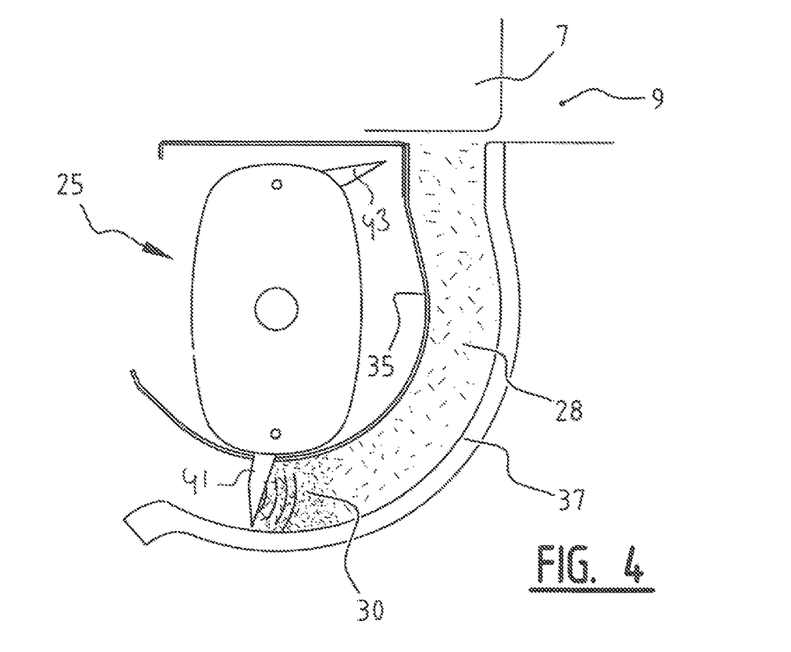
FIGS. 4 to 6 show in schematic side view the feeding duct of the baler of FIG. 1 for illustrating an embodiment of the method according to the invention for removing a stuck plug of crop material from the feeder duct.

In FIG. 4 is shown a situation wherein during accumulation of the charge of crop material 28, a plug 30 of crop material gets stuck in the feeder duct 23 between the top wall 35 and bottom wall 37, causing the feeding means 25 to become inoperable.

Figure 5:
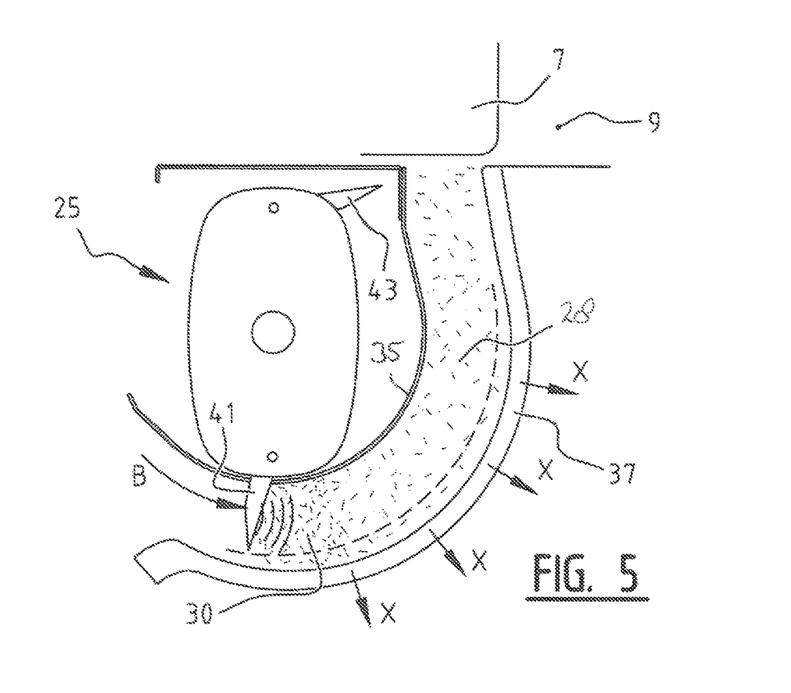
Figure 6:
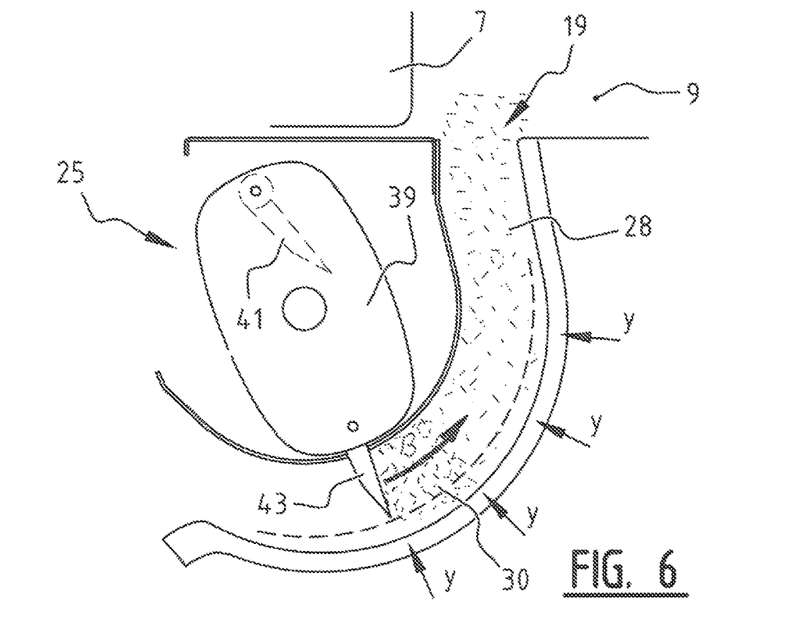

As illustrated by means of FIG. 5, according to an embodiment of the method of the present invention, the distance between the bottom wall 37 and the top wall 35 of the feeder duct 23 is increased by moving the bottom wall 37 away from the top wall 35 of the feeder duct 23 in the direction of arrow X while maintaining continuous the lower boundary defined by the bottom wall 37. As a result additional space is provided in the feeder duct 23 that relieves the pressure exerted on the stuck plug 30 of crop material and that allows for more movement of the stuck plug 30 of crop material and the crop material 28 downstream thereof. Subsequently, the feeder means 25 are caused to resume operation wherein the outer ends of the tines 41, 43 are caused to move along a path of movement through the feeder duct 23 in the direction indicated by arrow B. As a result of the relieved pressure exerted on the stuck plug 30 of crop material at its downstream side and the additional space for moving the plug 30 of crop material and the crop material 28 downstream thereof into the direction of the upper end of the feeder duct indicated by arrow B with reduced pressure build up, the counter pressure experienced by the outer ends of the tines 41 while exerting force on the stuck plug 30 of crop material at its upstream side, is reduced thereby allowing the outer ends of the tines 41 to dislodge the stuck plug 30 of crop material. This allows the feeder means 25 to resume normal operation, wherein, as illustrated by FIG. 6, once the plunger 7 that reciprocates in the bale chamber 9 is clear from the opening 19 in the bale chamber 9, and the bale chamber 9 is ready to receive the accumulated charge of crop material 28, the outer ends of the tines 43 are caused to be moved along a path of movement through the feeder duct 23 in the direction indicated by arrow B, thereby stuffing, i.e. conveying, the accumulated charge of crop material 28 including the dislodged plug 30 of crop material through the opening 19 into the bale chamber 9. After the charge of crop material 28 has been stuffed into the bale chamber 9, the bottom wall 37 is moved back towards the upper wall 35 of the feeder duct 23 in the direction of arrow Y, such that the feeder means 25 can accumulate a next charge of crop material in the feeder duct 23.

Figure 7:
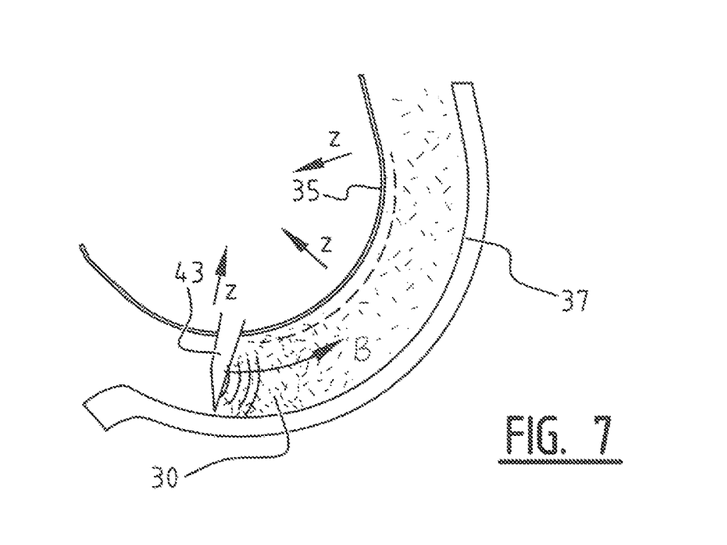
FIG. 7 shows in schematic side view an alternative embodiment of the method according to the invention

In FIG. 7 is schematically shown that as an alternative to the embodiment of the method of the present invention as described under reference to FIGS. 4 to 6, the distance between the bottom wall 37 and the top wall 35 of the feeder duct 23 is increased by moving the top wall 35 away from the bottom wall 37 of the feeder duct 23 in the direction of arrow Z while maintaining continuous the upper boundary defined by the upper wall 35.

As a further alternative to the embodiments of the method according to the invention described under reference to FIGS. 4 to 7, a plugging of the feeder duct 23 may advantageously be prevented by increasing the distance between the bottom wall 37 and the top wall 35 of the feeder duct 23 in case there is an indication that a plugging of the feeder duct 23 is about to occur. In case for instance the load on the feeder means is measured and the measured load rises above a certain predetermined level indicative of a plugging of the feeder duct 23 about to occur, increasing the distance between the bottom wall 37 and the top wall 35 of the feeder duct 23 may advantageously prevent the plugging to occur.

Figure 8:
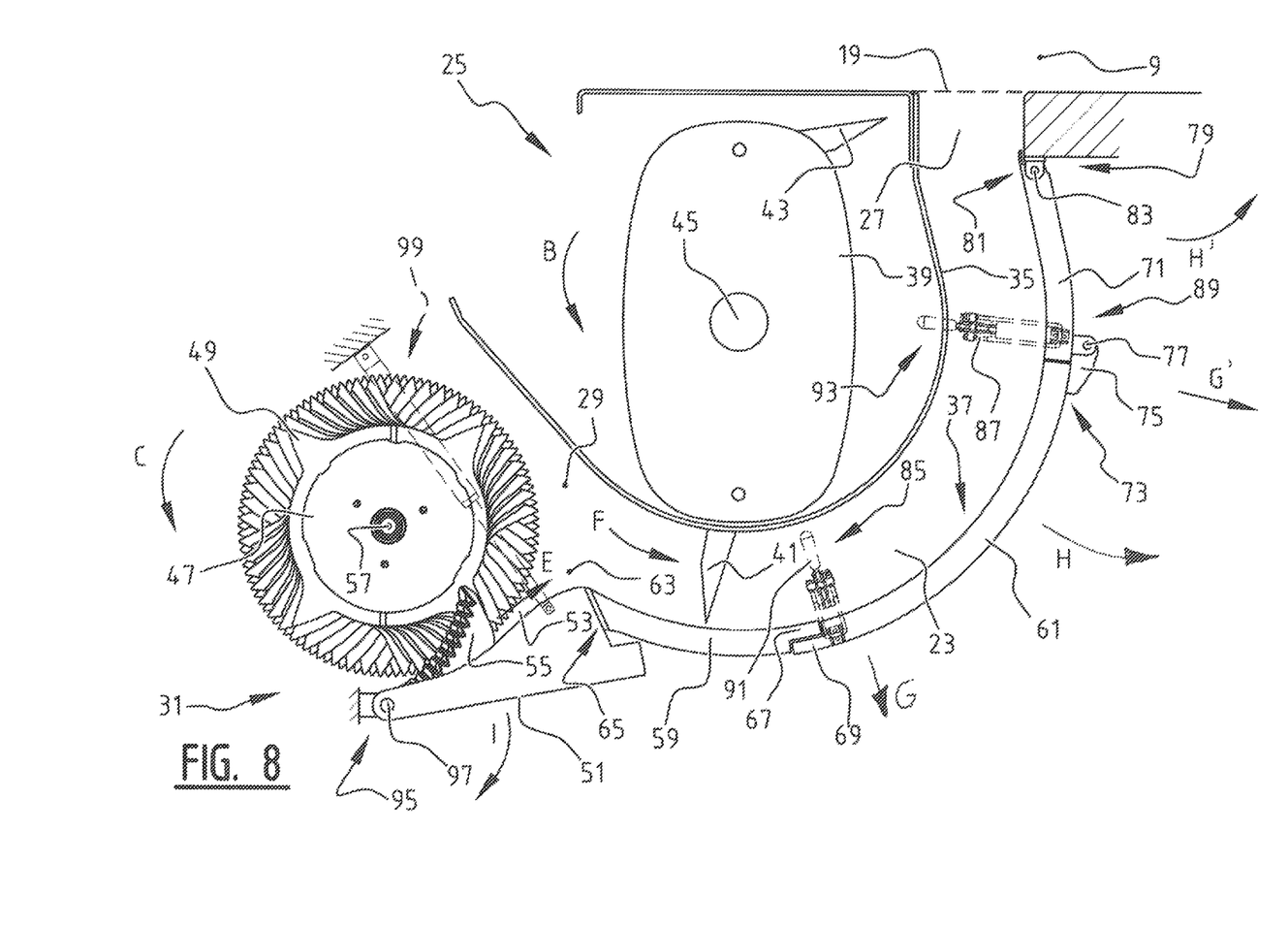
FIG. 8 shows in schematic side view a preferred embodiment of the feeder duct of the baler of FIG. 1 that is configured for executing the method according to the invention as illustrated by FIGS. 4 to 6.

In FIG. 8 a preferred embodiment of the feeder duct 23 of the baler 1 of FIG. 1 is shown that is configured for executing the method according to the invention as described under reference to FIGS. 4 to 6. The feeder duct is defined between a feeder duct top wall 35 and feeder duct bottom wall 37. The feeder duct top wall 35 provides an upper boundary for the feeder duct 23. The feeder duct bottom wall 37 provides a lower boundary for the feeder duct 23. In the feeder duct 23 feeder means 25 are operable. The feeder means 25 include a rotatable drum 39 having sets of tines 41, 43 arranged thereon. In operation the drum 39 is rotated in the direction of arrow B about axis of rotation 45. The feeder means are configured for causing the outer ends of the tines to be moved along a path of movement through the feeder duct 23, thereby conveying crop material that has been conveyed by the cutting unit 31 into the lower end 29 of the feeder duct 23, from the lower end 29 of the feeder duct 23 toward the upper end 27 thereof.

The cutting unit 31 is provided with cutter means in the form of a rotor 47 carrying a set of tines 49. A cutting unit bottom 51 distant from the rotor 47 forms a bottom wall 51 of a conveying channel 53 through the cutting unit 31. Cutting blades 55 protrude from the cutting unit bottom 51 through the conveying channel 53. During operation the rotor 47 is rotated in the direction of arrow C about axis of rotation 57. Crop material fed to the cutting unit 31 by means of the pickup device 33 (shown in FIG. 1) in the direction of arrow D is conveyed by means of the rotor 47 through the conveying channel 53 along the cutting blades such that the crop material is cut. The rotor 47 conveys the cut crop material further towards the inlet of the feeder duct at the lower end 29 of the feeder duct 23 in the direction of arrow E. Once in the feeder duct 23, the cut crop material is engaged by the tines 41, 43 of the feeder means for conveying the cut crop material from the lower end 29 of the feeder duct 23 toward the upper end 27 thereof in the direction of arrow F. In the feeder duct the cut crop material is accumulated in the upper end thereof to form a charge of cut crop material. After forming a charge of crop material, the feeder means 25 stuff the charge of crop material through the inlet 19 of the bale chamber 9 at the upper end 27 of the feeder duct 23 into the bale chamber 9.

The feeder duct 23 is provided with two doors: a front door 59 and a rear door 61. In FIG. 2 the front door 59 and the rear door 61 are shown in their closed position. The front door 59 is formed by a lower end part of the bottom wall 37. The front door 59 extends between an inlet 63 of the feeder duct 23 at the lower end 29 thereof and the rear door 61. Front door 59 is at one edge 65 thereof attached to the bottom wall 51 of the cutting unit 31. The other edge 67 of the front door 59 is adjacent an edge 69 of the rear door 61. As shown in FIG. 8, the adjacent edges 67, 69 overlap in the closed position of the doors 59, 61.

The rear door 61 is formed by a central part of the bottom wall that extends between the front door 59 and an upper end part 71 of the bottom wall 37. The rear door 61 has one edge 69 adjacent the front door 59. At the opposite edge 73, the rear door is hingedly attached to the upper end part 71 of the bottom wall 37 by means of a hinge 75 defining a pivot axis 77. The upper end part 71 of the bottom wall 37 is at its edge 79 opposite to the edge 73 to which the rear door 61 is attached, hingedly attached at the end 27 of the feeder duct 23 near the inlet 19 of the bale chamber 9 by means of a hinge 81 defining a pivot axis 83.

Rear door 61 and the upper end part 71 of the bottom wall to which the rear door 61 is hingedly attached are held in the closed position thereof by means of a first latch 85 engaging the rear door 61 near its edge 69 that is adjacent the front door 59, and by means of a second latch 87 engaging the upper end part 71 of the bottom wall 37 near its edge 89 to which the rear door 61 is hingedly attached.

Front door 59 is at one edge 65 thereof held in the closed position by being attached to the bottom wall 51 of the cutting unit 31. At its opposite edge 67 adjacent the rear door 61, the front door 59 is held in the closed position by means of the first latch 85 by virtue of a stepped overlap between the edge 67 of the front door 59 and the edge 69 of the rear door 61, wherein the edge 69 of the rear door 61 engages underneath the edge 67 of the front door 59.

The first latch 85 is provided with a lever 91, that allows the point where the first latch 85 engages the rear door 61 to be manually moved away from the top wall 35 of the feeder duct 23 in the direction of arrow G, thereby moving the rear door 61 away from the top wall 35 of the feeder duct 23 in the direction of arrow H by rotation about the axis of rotation 77. Once the rear door 61 is moved away from the top wall 35 of the feeder duct 23 by means of the first latch 85, the upper end part 71 of the bottom wall 37 may be moved by means of the second latch 87. The second latch 87 is provided with a lever 93, that allows the point where the second latch 87 engages the upper end part 71 of the bottom wall 37 to be manually moved away from the top wall 35 of the feeder duct 23 in the direction of arrow G', thereby moving the upper end part 71 of the bottom wall 37 away from the top wall 35 of the feeder duct 23 in the direction of arrow H' by rotation about the axis of rotation 83.

The bottom wall 51 of the cutting unit 31 is hingedly attached to a frame part of the baler by means of a hinge 95 defining a pivot axis 97, and movable by means of a linear actuator 99 in the direction of arrow I away from the rotor cutter 47. By moving the bottom wall 51 of the cutting unit 31 by means of a linear actuator 99 in the direction of arrow I, the front door 59 that is attached to the bottom wall 51 of the cutting unit 31 can be moved away from the top wall 35 of the feeder duct 23 in the direction of arrow I. During normal operation of the baler, the front door 59 and rear door 61 are in the shown closed position.

In case of a plugging of the feeder duct 23 as a result of a plug of crop material being stuck between the top wall 35 and bottom wall 37 of the feeder duct 23, in accordance with the method according to the invention, the front door 59, the rear door 61, and upper end part 71 of the bottom wall 37 are moved away from the top wall 35 of the feeder duct 23 by means of the linear actuator 99 and the latches 85, 87, thereby increasing the distance between the top wall 35 and the bottom wall 37 of the feeder duct 23.

Figure 9:
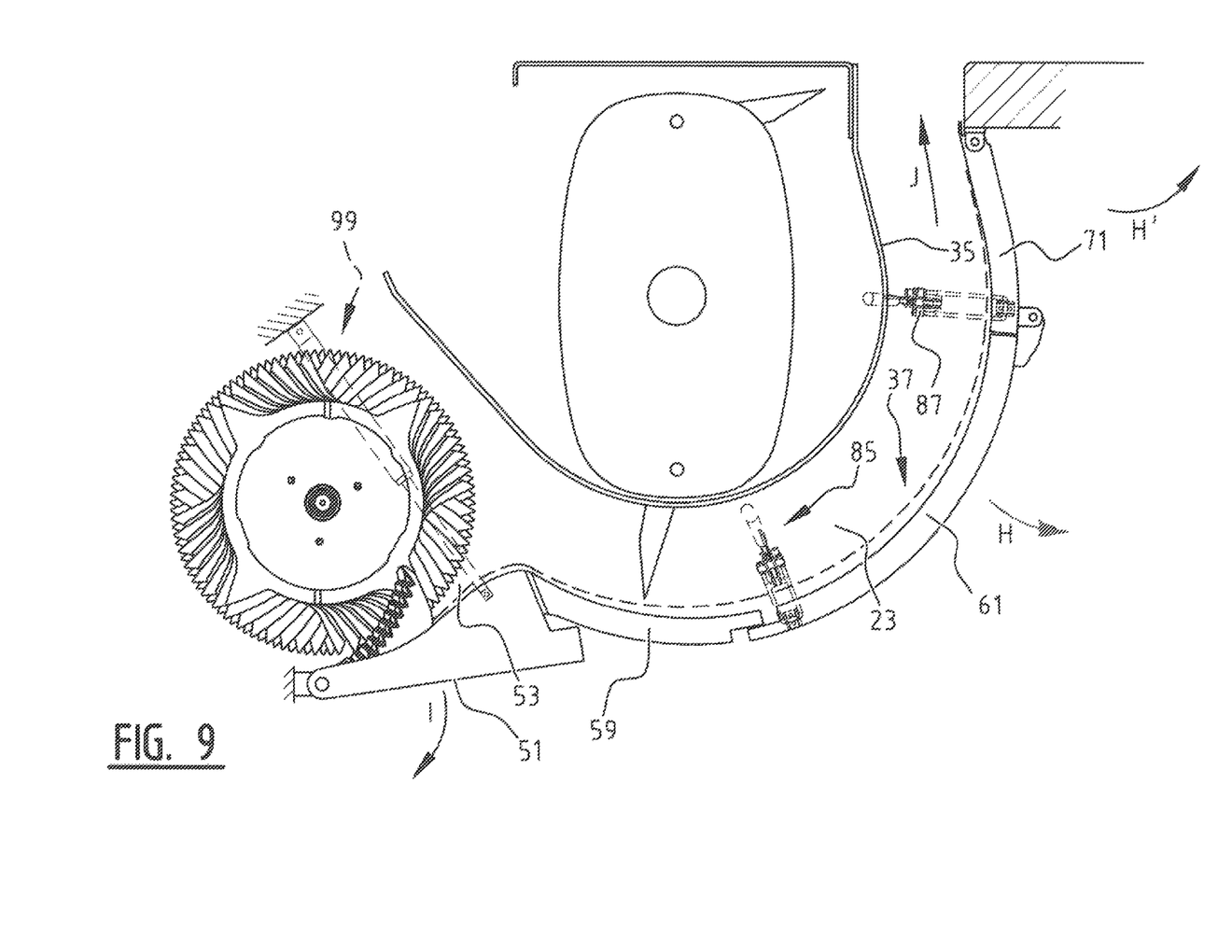
FIG. 9 shows in schematic side view the feeding duct of the baler of FIG. 8 while executing the method according to the invention as illustrated by FIGS. 4 to 6.

In particular, as shown in FIG. 9, by moving the front door 59, the rear door 61, and the upper end part 71 of the bottom wall 37 away from the top wall 35 of the feeder duct 23 by means of the linear actuator 99 and the latches 85, 87, respectively, the front door 59, rear door 61 and upper end part 71 of the bottom wall 37 are position in a partly opened position. The latches 85, 87 thus provide means adapted for selectively moving the rear door 61 and the upper end part 71 of the bottom wall 37 between a closed position and a partly opened position. The linear actuator 99 provide means adapted for selectively moving the adjacent front door 59 between a closed position and a partly opened position. In the partly opened position, the lower boundary provided by the front door 59, rear door 61 and upper end 71 of the bottom wall 37 is maintained in tact, albeit that it is moved away from the top wall of the feeder duct 23 relative to the lower boundary provided in the closed position indicated by the dotted line.

The front door 59, rear door 61 and upper end 71 of the bottom wall 37 thus are sections of the bottom wall 37, that are movable relative to the top wall 35 of the feeder duct 23. The adjacent sections formed by the rear door 61 and upper end 71 of the bottom wall 37 are mutually hingedly attached along adjacent edges, such that when moving the rear door 61 and upper end 71 of the bottom wall 37 the adjacent edges of the rear door 61 and upper end 71 of the bottom wall 37 remain adjacent to one another, such that no opening of the part of the lower boundary provided by the rear door 61 and upper end 71 of the bottom wall 37 results. The linear actuator 99 and the latches 85, 87 are configured to move the front door 59, the rear door 61 and upper end 71 of the bottom wall 37 into the partly opened position in such a way, that the adjacent edges of the adjacent sections formed by the front door 59 and the rear door 61 despite not being mutually hingedly attached remain adjacent to one another, such that no opening of the part of the lower boundary provided by the front door 59 and the rear door 61 results. As a result of the adjacent edges of the front door 59 and the rear door 61 having a stepped overlap, the adjacent edges of the front door 59 and the rear door 61 still overlap in the partly opened position, despite the lengthening of the lower boundary provided by the bottom wall 37 of the feeder duct 23 as a result of being moved away from the top wall 35 of the feeder duct. Positioning the front door 59 and the rear door 61 in the partly opened position thus does not result in an opening in the part of the lower boundary provided by the front door 59 and the rear door 61.

In the shown partly opened position, the space in the feeder duct is increased relative to the situation shown in FIG. 8 with the front door 59 and rear door 61 in the closed position thereof. In case during normal operation a plug of crop material is stuck in the feeder duct 23, preventing further operation, moving the front door 59, rear door 61 and upper end 71 of the bottom wall 37 in the partly opened position, the increased space in the feeder duct 23 releases the pressure on the plug of crop material and provides additional space for the plug of crop material to move. This allows in many cases to dislodge the plug of crop material and remove the plug of crop material from the feeder duct 23 into the bale chamber 9 in the direction of arrow J, by causing the feeder means 25 to resume operation while the front door 59, rear door 61, and upper end part 71 of the bottom wall 37 of the feeder duct 23 are in the partly opened position. After removal of the plug of crop material from the feeder duct 23, the front door 59, rear door 61, and upper end part 71 of the feeder duct 23 can be positioned in the closed position by means of the linear actuator 99 and the latches 85, 87, respectively. With the front door 59, rear door 61, and upper end part 71 of the feeder duct 23 positioned in the closed position, normal operation of the baler can resume.

Figure 10:
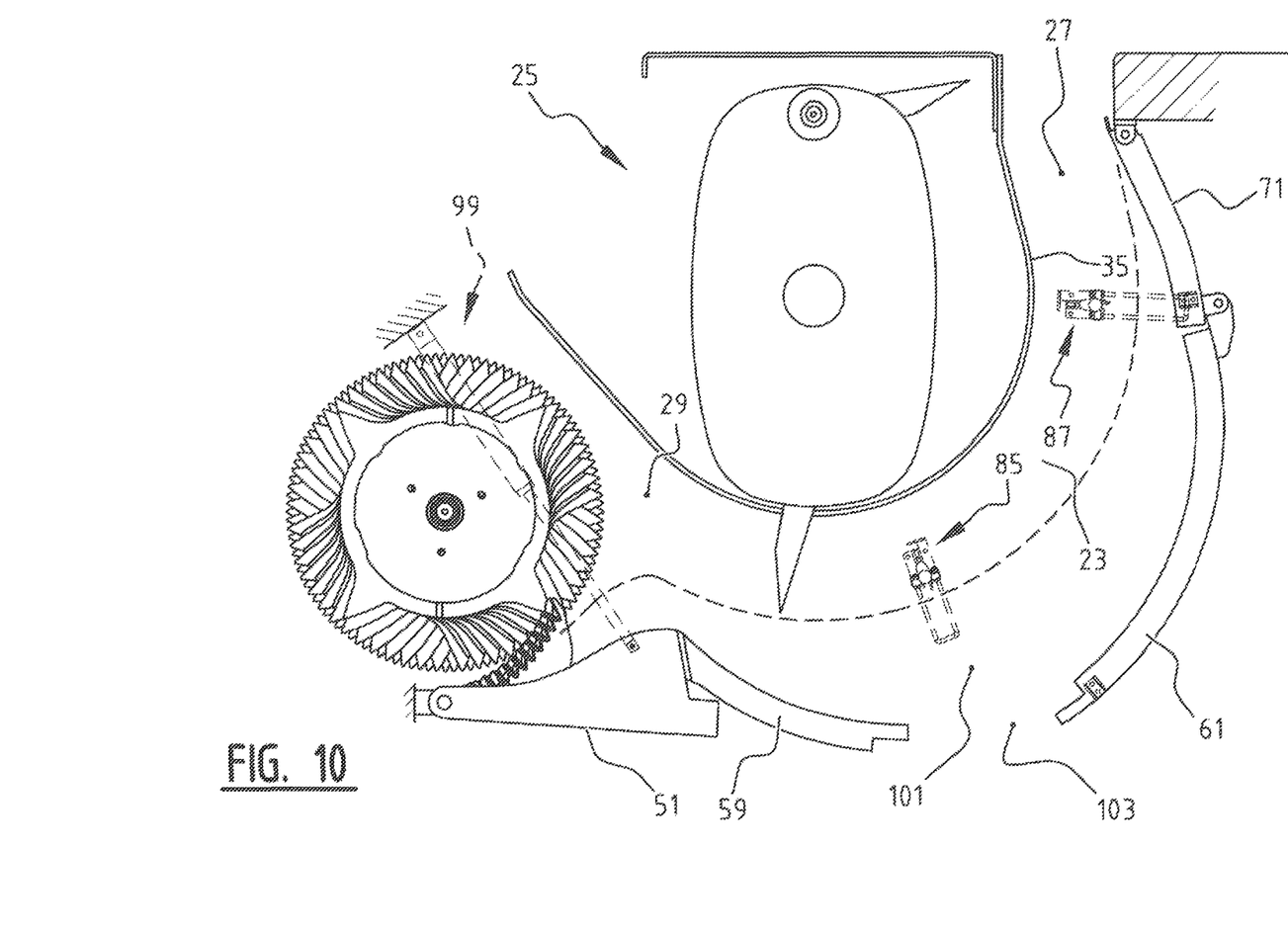
FIG. 10 shows in schematic side view the feeding duct of the baler of FIG. 8 in case the method according to the invention as illustrated by FIGS. 4 to 6 does not succeed.

In case a stuck plug of crop material cannot be dislodged and/or removed from the feeder duct 23 by means of the feeder means 25 with the front door 59, rear door 61, and upper end part 71 of the feeder duct 23 in the partly opened position, the front door 59, rear door 61, and upper end part 71 of the feeder duct 23 can be positioned in an open position in which they do no longer provide the lower boundary of the feeder duct 23. To that effect, starting from the situation shown in FIG. 9, the rear door 61 is releasable from the first latch 85, the upper end part 71 of the bottom wall 37 is releasable from the second latch 87, such that the rear door 61 and the upper end part of the bottom wall 71 can be moved further away from the top wall of the feeder duct in the direction of arrow H and H'. Additionally, the front door 59 can be moved further away from the top wall 35 of the feeder duct 23 by further moving the bottom wall 51 of the cutting unit 31 by means of the linear actuator 99 in the direction of arrow I. The result is shown in FIG. 10. In the opened position of the front door 59, rear door 61, and upper end part 71 of the feeder duct 23, they do no longer provide a continuous lower boundary of the feeder duct 23. The further increased space in the feeder duct 23 at both ends 27, 29 thereof as well as in the central part 101 of the feeder duct 23 further releases pressure on a stuck plug of crop material and provides additional space for movement. A plug of crop material stuck in the feeder duct 23 can in this position of the front door 59, rear door 61, and upper end part 71 of the feeder duct discharge onto the ground underneath the feeder duct 23 through the opening 103 between the adjacent edges 65, 67 of the front door 59 and the rear door 61, either under influence of its own weight or by additional dislodging, for instance by oscillating or rocking the drive train 13, 15, 17 (shown in FIG. 1) to the feeder means. After removal of the plug of crop material from the feeder duct 23, the front door 59, rear door 61, and upper end part 71 of the feeder duct can be positioned in the closed position again. The front door 59 can be positioned in the closed position by means of the linear actuator 99. The rear door 61 and upper part 71 of the bottom wall 37 can be positioned in the closed position by engaging the first and second latches 85, 87 and subsequently operating the latches 85, 87 to move the rear door 61 and upper part 71 of the bottom wall 37 into the closed position. With the front door 59, rear door 61, and upper end part 71 of the feeder duct 23 positioned in the closed position, normal operation of the baler can resume.

Figure 11:
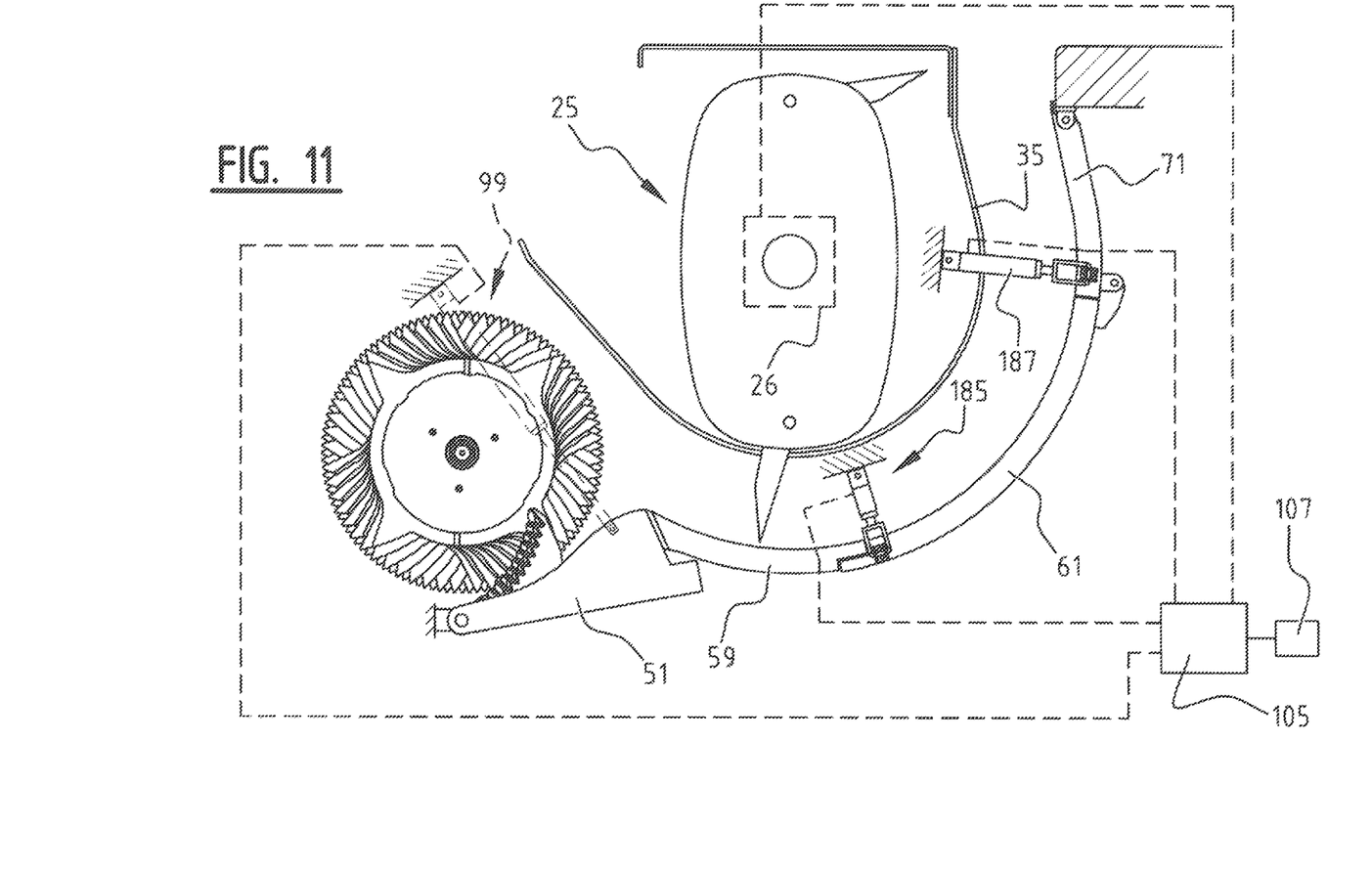
FIG. 11 shows an alternative embodiment of the feeder duct of the baler of FIG. 1 that is configured for executing the method according to the invention as illustrated by FIGS. 4 to 6.

In FIG. 11 an alternative embodiment of the feeder duct 23 of the baler 1 shown in FIGS. 8 to 10 is shown, wherein the manually operated, first and second latches 85, 87, have been replaced by a first and second linear actuator 185, 187. The first and second linear actuators 185, 187 replace the latches as means for holding the rear door 61 and the upper end part 71 of the bottom wall to which the rear door 61 is hingedly attached in the closed position. The linear actuators 185, 187 are adapted for selectively moving the rear door 61 and the upper end part 71 of the bottom wall to which the rear door 61 is hingedly attached between the shown closed position and the partly opened position shown in FIG. 9. The linear actuators 185, 187, as well as the linear actuator 99, are connected to a controller 105 for controlling the linear actuators 99, 185, 187. Sensor means 107 are provided, that are connected to the controller 105 and adapted for detecting plugging of the feeder duct 23. The controller 105 is configured of controlling the linear actuators, 99, 185, 187 such that the front door 59, the rear door 61, and the end part 71 of the bottom wall 37 are moved into the partly opened position that is shown in FIG. 9 when a plugging of the feeder duct 23 is detected by said sensor means 107. The rear door 61 is releasable from the first linear actuator 185, the upper end part 71 of the bottom wall 37 is releasable from the second linear actuator 187, such that the rear door 61 and the upper end part of the bottom wall 71 can be moved into the opened position that is shown in FIG. 9. In stead of being releasable from the first linear actuator 185 and the second linear actuator 187 in order for the rear door 61 and the upper end part 71 of the bottom wall 37 to be moved into the opened position, the first linear actuator 185 and the second linear actuator 187 are configured and arranged for moving the rear door 61 and the upper end part 71 of the bottom wall 37 from the partly opened position that is shown in FIG. 9 into the opened position that is shown in FIG. 10.

As shown in FIG. 11 the controller 105 is also connected to the drive 26 of the feeder means 25. This allows the controller 25 to autonomously execute the method according to the invention as described under reference to FIGS. 2 to 6. The controller 105 may be configured for causing the drive 26 to stop the operation of the feeder means 25 when a plugging of the feeder duct 23 is detected and for causing the drive 26 to resume the operation of the feeder means 25 after the front door 59, the rear door 61, and the end part 71 of the bottom wall 37 have been moved into the partly opened position. The sensor means 107 may be configured to detect the location along the feeder duct 23 where the plugging has occurred. This would allow the controller 105 to be configured to only cause the rear door 61, and the end part 71 of the bottom wall 37 to be moved into the partly opened position when the plugging is detected in the end part of the feeder duct 23.

Although the principles of the invention have been set forth above with reference to specific embodiments, it must be understood that this description is given solely by way of example and not as limitation to the scope of protection, which is defined by the appended claims.

The invention claimed is:

1. A method for preventing or removing a plugging of a feeder duct of a baler, the baler comprising:
   a bale chamber comprising a bottom wall in which an inlet opening is formed therein;
   a feeder duct communicating with the bale chamber through the inlet opening for charges of crop material to be transferred from the feeder duct into the bale chamber, the feeder duct comprising an upper end facing generally upwardly and communicating with the inlet opening in the bale chamber and a lower end facing generally in a forward direction, the feeder duct further comprising a top wall and a bottom wall extending between the lower end and the upper end of the feeder duct, the top wall providing an upper boundary of the feeder duct and the bottom wall providing a lower boundary of the feeder duct, wherein the bottom wall of the feeder duct is divided in at least a first section and a second section along a length of the feeder duct;
   a conveying channel communicating with the lower end of the feeder duct for crop material to be conveyed to the feeder duct, wherein the conveying channel comprises a pivotable bottom wall located adjacent a free end of the first section of the feeder duct;
   a plunger reciprocable within the bale chamber to compress successive charges of crop material received from the feeder duct to form a bale; and
   a feeder operable within the feeder duct to accumulate a charge of crop material therein and then stuff that accumulated charge into the bale chamber,
   wherein the method comprises steps of:
   monitoring a crop pressure in the feeder duct as a function of a location along the length of the feeder duct;
   increasing a distance between the top wall and the bottom wall of the feeder duct in at least a part of the feeder duct, while leaving the upper boundary provided by the top wall of the feeder duct and the lower boundary provided by the bottom wall of the feeder duct intact, wherein the step of increasing comprises sub-steps of:
   increasing the distance between the top wall and the bottom wall of the feeder duct in the at least a part of the feeder duct where the crop pressure exceeds a predetermined pressure by pivoting the first section about a first pivot and the second section about a second pivot; and
   displacing the first pivot; and
   causing the feeder to operate in the feeder duct with the increased distance between the top wall and the bottom wall.

2. The method according to claim 1, wherein the step of increasing further comprises a sub-step of increasing the distance between the top wall and the bottom wall of the feeder duct in at least a part of the feeder duct where a plugging has occurred.

3. The method according to claim 2, wherein the step of increasing further comprises a sub-step of increasing the distance between the top wall and the bottom wall of the feeder duct in a part of the feeder duct downstream of the at least part of the feeder duct where the plugging has occurred.

4. The method according to claim 1, wherein a conveyor operable in the conveying channel to convey the crop material along the bottom wall of the conveying channel to the feeder duct, and
wherein the method further comprises steps of:
in case a plugging occurs in the lower end part of the feeder duct, increasing the distance between the top wall and the bottom wall of the feeder duct in at least the lower end of the feeder duct by moving a lower end part of the bottom wall of the feeder duct away from the top wall of the feeder duct; and
moving the bottom wall of the conveying channel such that adjacent edges of the bottom wall of the conveying channel and of the lower end part of the bottom wall of the feeder duct remain mutually adjacent.

5. The method according to claim 1, further comprising steps of:
detecting an occurrence of a plugging of the feeder duct; and
after detecting the occurrence of the plugging of the feeder duct, increasing the distance between the top wall and the bottom wall of the feeder duct along substantially a whole length of the feeder duct.

6. The method according to claim 1, further comprising steps of:
detecting an occurrence of a plugging of the feeder duct;
detecting a part of the feeder duct where the plugging has occurred; and
increasing the distance between the top wall and the bottom wall of the feeder duct in at least the part of the feeder duct wherein the plugging is detected.

7. The method according to claim 6, wherein the distance between the top wall and the bottom wall of the feeder duct is additionally increased in a part of the feeder duct downstream of the part wherein the plugging is detected.

8. The method according to claim 6, wherein the distance between the top wall and the bottom wall of the feeder duct is additionally increased along substantially a whole length of a remaining downstream part of the feeder duct.

9. The method according to claim 1, wherein the step of increasing further comprises a sub-step of increasing the distance between the top wall and the bottom wall of the feeder duct along substantially a whole length of the feeder duct in case the crop pressure exceeds the predetermined pressure.

10. The method according to claim 1, wherein the step of monitoring comprises monitoring the crop pressure by measuring a load on the feeder during operation thereof in the feeder duct.

11. The method according to claim 1, wherein the step of increasing further comprises a sub-step of additionally increasing the distance between the top wall and the bottom wall of the feeder duct in a part of the feeder duct downstream of the at least a part of the feeder duct where the crop pressure exceeds the predetermined pressure.

12. An agricultural baler, comprising:
a bale chamber comprising a bottom wall in which an inlet opening is formed therein;
a feeder duct communicating with the bale chamber through the inlet opening for charges of crop material to be transferred from the feeder duct into the bale chamber, the feeder duct comprising an upper end facing generally upwardly and communicating with the inlet opening in the bale chamber and a lower end facing generally in a forward direction, the feeder duct further comprising a top wall and a bottom wall extending between the lower end and the upper end of the feeder duct, the top wall providing an upper boundary of the feeder duct and the bottom wall providing a lower boundary of the feeder duct, wherein the bottom wall of the feeder duct is divided in at least two sections along a length of the feeder duct;
a conveying channel communicating with the lower end of the feeder duct for crop material to be conveyed to the feeder duct, wherein the conveying channel comprises a pivotable bottom wall located adjacent a free end of one of the at least two sections of the feeder duct;
a plunger reciprocable within the bale chamber to compress successive charges of crop material received from the feeder duct to form a bale;
a feeder operable within the feeder duct to accumulate a charge of crop material therein and then stuff that accumulated charge into the bale chamber; and
an actuator for moving the bottom wall of the feeder duct relative to the top wall of the feeder duct in at least part of the feeder duct,
wherein each of the at least two sections having an edge, the edges of the at least two sections being adjacent,
wherein the actuator is adapted for selectively moving the at least two sections relative to the top wall of the feeder duct by:
pivoting a first of the at least two sections about a first pivot and a second of the at least two sections about a second pivot; and
displacing the first pivot; and,
wherein:
the adjacent edges of the at least two sections are mutually attached such that when moving the at least two sections the adjacent edges of the at least two sections remain adjacent to one another; or
the actuator is adapted to move the at least two sections such that the adjacent edges of the at least two sections remain adjacent to one another, and
wherein at least one of the at least two sections is in the form of a door, the edge of the at least one of the at least two sections is selectively movable away from the edge of the other of the at least two sections in order to provide an opening between the adjacent edges.

13. The agricultural baler according to claim 12, wherein the actuator is adapted for acting on at least a part of the bottom wall of the feeder duct, the agricultural baler further comprising a controller connected to the actuator, and a sensor adapted for detecting a plugging of the feeder duct or for measuring an operational parameter indicative of a crop pressure in the feeder duct.

14. The agricultural baler according to claim 13, wherein the controller is configured to control the actuator to increase the distance between the top wall and the bottom wall of the feeder duct in at least a part of the feeder duct where the crop pressure exceeds a predetermined pressure.

15. The agricultural baler according to claim 12, wherein the actuator comprises at least one manually operated member acting on at least a part of the bottom wall of the feeder duct, the manually operated member defining predefined positions of the part on which it acts.

* * * * *